W. J. GORMAN, L. FRANKEL, AND A. A. WOHLGEZON.
COUPLING FOR ELECTRIC LIGHT FIXTURES.
APPLICATION FILED SEPT. 8, 1920.
1,431,450.
Patented Oct. 10, 1922.
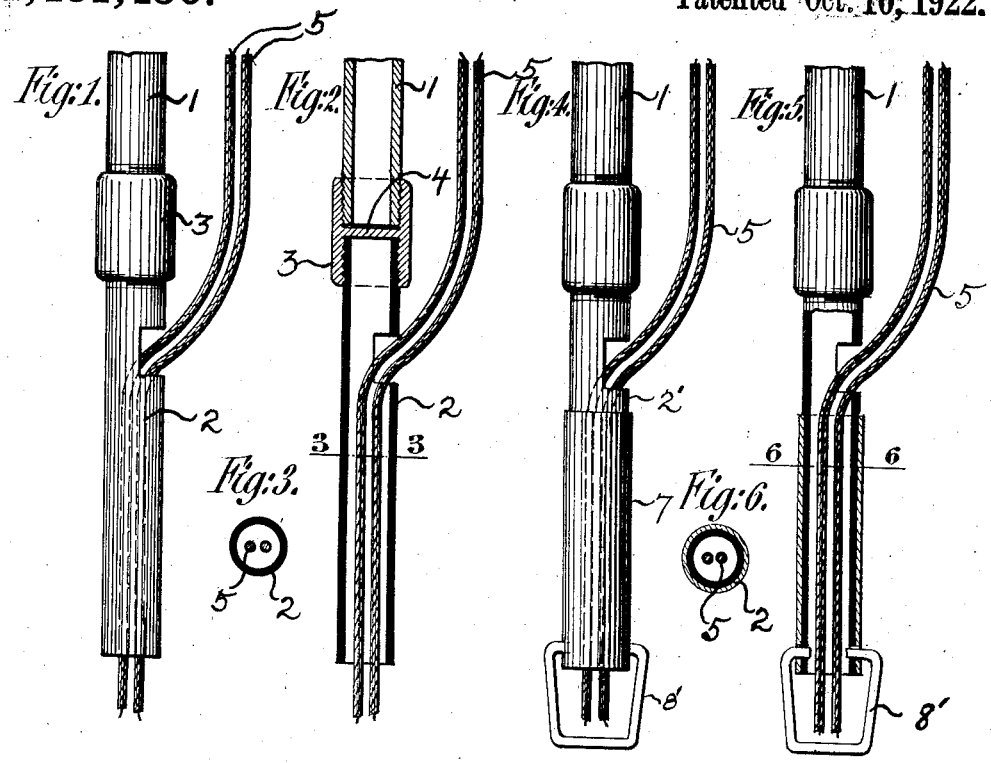
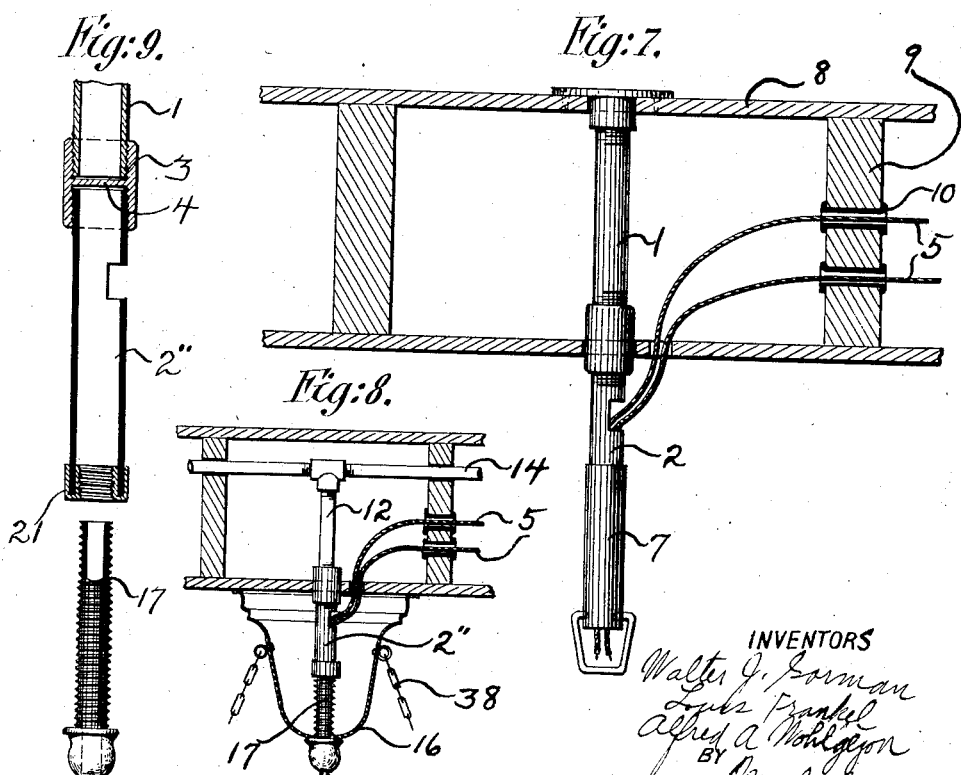
INVENTORS
Walter J. Gorman
Louis Frankel
Alfred A. Wohlgezon
BY
ATTORNEYS

UNITED STATES PATENT OFFICE.

WALTER J. GORMAN, LOUIS FRANKEL, AND ALFRED A. WOHLGEZON, OF CHICAGO, ILLINOIS.

COUPLING FOR ELECTRIC-LIGHT FIXTURES.

Application filed September 8, 1920. Serial No. 408,808.

*To all whom it may concern:*

Be it known that we, WALTER J. GORMAN, LOUIS FRANKEL, and ALFRED A. WOHLGEZON, citizens of the United States, residing at Chicago, in the county of Cook and State of Illinois, have invented certain new and useful Improvements in a Coupling for Electric-Light Fixtures, of which the following is a specification.

Our invention relates to a new and improved coupling or connection for electric light fixtures. Heretofore in wiring buildings it has been customary to provide conduit or connecting boxes in the ceilings or walls of the rooms directly adjacent the point at which the fixtures were to be located.

The electric mains or wires suitably insulated were led into this box. The electric fixtures have ordinarily included a metal tube having an orifice at one side thereof, through which the branch wires were led, and secured to the socket for the electric bulb, so as to carry the current from the mains.

According to our invention, a very cheap, simple and efficient coupling is provided which materially lessens the labor necessary in making the necessary connections.

Other objects of our invention will be disclosed in the following description and drawings which illustrate a preferred embodiment thereof.

Fig. 1 is an elevation of one embodiment of our invention.

Fig. 2 is a vertical central section of Fig. 1.

Fig. 3 is a section along the line 3—3 of Fig. 2.

Fig. 4 is an elevation of another embodiment of our invention.

Fig. 5 shows Fig. 4 partially in section.

Fig. 6 is a section along the line 6—6 of Fig. 5.

Fig. 7 is a section showing the coupling box and the manner in which the fixture is secured thereto.

Fig. 8 shows how another modification is secured to the box.

Fig. 9 shows a detail of the modification of Figure 8.

The embodiment shown in Figs. 1, 2 and 3 is adapted more particularly for old houses having gas fixtures in place, to which it is desired to secure electric fixtures. The tube 1 shows an old connection for the gas fixture and is made of metal.

The tubular member 2 made of insulating fiber is secured to the tube 1 by means of the support or nipple 3, which as shown in Fig. 2 has a diaphragm 4 so as to prevent any gas from leaking through the pipe 1. The two leads 5 are passed through a perforation in the side of the fiber tube 2 and are led through the tube 2 to the electric socket. As seen in Fig. 2, the upper end of the tube 2 is externally threaded so as to cooperate with the internal threading of the nipple 3.

By making the tube 2 of suitable indurated fiber, the threading thereof can be quickly and cheaply accomplished and the labor of securing the parts together is minimized in comparison with the labor and expense of making the old type of insulating washer and securing it in place.

In the construction shown in Figures 4 and 5, the metal tube 1 is secured to the conduit box in any suitable manner, and the metal tube 7 is firmly secured to the fiber tube 2 by any suitable means. In the same construction the fiber tube 2' and the metal tube 7 have secured to the lower parts thereof, by any suitable means, a link or supporting member 8' which carries or supports the fixture, which is not shown in the drawings but may be of any standard type.

In Fig. 7 a conventional construction is shown of the conduit box 8 having the wall 9 provided with insulating bushings 10 through which the leads 5 pass. The metal tube 1 in Figs. 4 and 5 for example is suitably secured to the box 8 and the other parts are as before described in connection with Figs. 4 and 5. In Fig. 8, the fiber tube 2″ is shown secured to a metal rod 12 secured to a cross bar 14.

A canopy 16 is secured to the fiber tube

2" by means of a hollow and externally threaded bolt 17 through the hollow of which the wires 5 pass.

The chains 38 serve to support other parts of the fixture as is well known.

Fig. 9 illustrates the construction shown in Figs. 1 and 2 save that the bottom of the fiber tube 2" is provided with an internally threaded member 21 made of metal or the like, to which the hollow and externally threaded bolt 17 is secured.

In all of these embodiments, the fixture is supported by an insulator body, but is located below the said insulator body so that the dimensions of the said insulator body which supports the fixture are entirely independent of the said fixture. According to this invention, therefore, the supporting insulator bodies can be made of a standard size or sizes, irrespective of the size or type of fixture which is to be connected to the part 8' or the part corresponding thereto. In all the embodiments herein described, the non-conducting part of the supporting insulator body supports the weight of the fixture, instead of merely serving to space metal members which are necessary to carry the weight of the fixture. It is obvious that if the supporting body would be made of several parts which could be detached one from the other, that this would be an equivalent for some of the structures shown herein, as, for example in Figs. 4 and 5, where the supporting body is made of several parts which are permanently connected.

We have described preferred embodiments of our invention, which show various ways of producing a member which constitutes the hickey in that it insulates the fixture from the stud or the like and simultaneously acts as a supporting member and a guide for the lead wires.

For example, we have provided a tube made of fiber but any suitable equivalent insulating material is included by this term, wherever it occurs throughout this specification including the claims thereof. It is obvious that where an insulating tube is mentioned in the specification it is immaterial that part of the tube may be made of metal or the like, as long as the entire tube or its equivalent, considered as a unit, is non-conducting.

The fiber is preferably indurated and the fiber tube can be covered with a paint or the like to get a metallic appearance.

We claim:—

1. The combination with a threaded support adapted to be secured in a wall or ceiling, of a tubular member of fibrous insulating material, the upper end portion of said tubular member being of substantially uniform diameter and provided with complementary screw threads for co-operation with the threaded support and adapted to be freely inserted through a canopy, a supporting member or link mounted in the opposite walls of said tubular member adjacent the lower end portion thereof and adapted to support a lighting fixture, a portion of said tubular member being cut away on a side thereof to provide an aperture having walls of insulating material and to permit a conductor to pass within and through said tubular member, and a metallic sleeve secured around the lower end portion of the tubular insulating material and adapted to provide a metallic bearing for the link or supporting member.

2. The combination with a threaded support adapted to be secured in a wall or ceiling, of a tubular member of insulating material having a substantially uniform area of cross-section provided with complementary screw threads on the upper portion thereof for co-operation with the threaded support and adapted to be freely inserted through a canopy and to extend below the same, a supporting member mounted on the lower end portion of said tubular member and adapted to support a lighting fixture, a portion of said tubular member being cut away on a side thereof to provide an aperture having walls of insulating material and to permit a conductor to pass within and through said tubular member.

3. The combination with a threaded support adapted to be secured in a wall or ceiling of a tubular member of fibrous insulating material of substantially uniform diameter and attached to the threaded support and adapted to be freely inserted through a canopy, a supporting member or link adapted to support a lighting fixture, and a metallic tubular section secured around the lower end portion of the tubular insulating material and adapted to provide a metallic bearing for the link or supporting member.

4. A support for lighting fixtures comprising a threaded member adapted to be secured in a wall or ceiling, a tubular member of fibrous insulating material of substantially uniform diameter, attached to the threaded support and adapted to be freely inserted through a canopy, a supporting member or link supported on the lower end of said tubular member and adapted to support a lighting fixture, a metallic tubular member secured to the lower portion of the tubular insulating member and adapted to provide a metallic bearing for the link or supporting member, a portion of the support being cut away on the side thereof to provide an aperture to permit a conductor to pass within and through said last mentioned tubular member.

5. A tubular support for lighting fixtures comprising a threaded support adapted to be secured in a wall or ceiling, a tubular member of fibrous insulating material of substantially uniform diameter and attached to the threaded support and adapted to be freely inserted through a canopy, a supporting member or link adapted to support a lighting fixture, a metallic tubular member secured to the lower end portion of the tubular insulating member and adapted to provide a metallic bearing for the link or supporting member, the support being provided with means whereby electrical connections may be brought through the said metallic tubular member at a point adjacent the link or supporting member.

In testimony whereof we hereunto affix our signatures.

WALTER J. GORMAN.
LOUIS FRANKEL.
ALFRED A. WOHLGEZON.